United States Patent [19]

McCartney et al.

[11] 4,166,884
[45] Sep. 4, 1979

[54] POSITION INSENSITIVE BATTERY

[75] Inventors: Joseph F. McCartney, Solana Beach; William H. Shipman, La Mesa, both of Calif.

[73] Assignee: The United States of America as represented by the Secretary of the Navy, Washington, D.C.

[21] Appl. No.: 942,844

[22] Filed: Sep. 15, 1978

[51] Int. Cl.² ............................................. H01M 6/02
[52] U.S. Cl. ........................................ 429/10; 429/56; 429/63; 429/91; 429/166; 429/194
[58] Field of Search ................ 429/10, 56, 63, 72, 429/91, 94, 166, 167, 194, 199, 116

[56] References Cited

U.S. PATENT DOCUMENTS

| | | | |
|---|---|---|---|
| 3,460,993 | 8/1969 | Saunders et al. | 429/116 X |
| 3,510,361 | 5/1970 | Saunders | 429/116 X |
| 3,669,753 | 6/1972 | Kaye | 429/116 |
| 3,674,566 | 7/1972 | Powers | 429/116 |
| 3,846,177 | 11/1974 | Mauch et al. | 429/94 X |
| 3,945,846 | 3/1976 | Dey | 429/166 |
| 4,109,062 | 8/1978 | McCartney et al. | 429/194 X |

Primary Examiner—Anthony Skapars

Attorney, Agent, or Firm—Richard S. Sciascia; Ervin F. Johnston

[57] ABSTRACT

An improvement is provided for a battery which has an anode and a cathode, a pair of spaced apart concentric tubes, a piston mounted in the inner tube, an electrolyte disposed in the inner tube between one side of the piston and one end of the inner tube, and a device disposed in the inner tube between the other side of the piston and the other end of the inner tube for biasing the piston toward the one end of the inner tube. The improvement includes the cathode being porous and being mounted in the annular space, and an electrolyte which substantially completely fills the pores of the cathode. The volume of the electrolyte within the porous cathode is substantially only sufficient for stoichiometry. A passageway is provided for communicating the electrolyte side of the inner tube with the annular space. The volume of the electrolyte within the inner tube is substantially only sufficient for filling the voids left within the annular space as the products react. With this arrangement the anode of the battery will be substantially completely reacted regardless of the position of the battery, thus resulting in a higher energy density.

10 Claims, 6 Drawing Figures

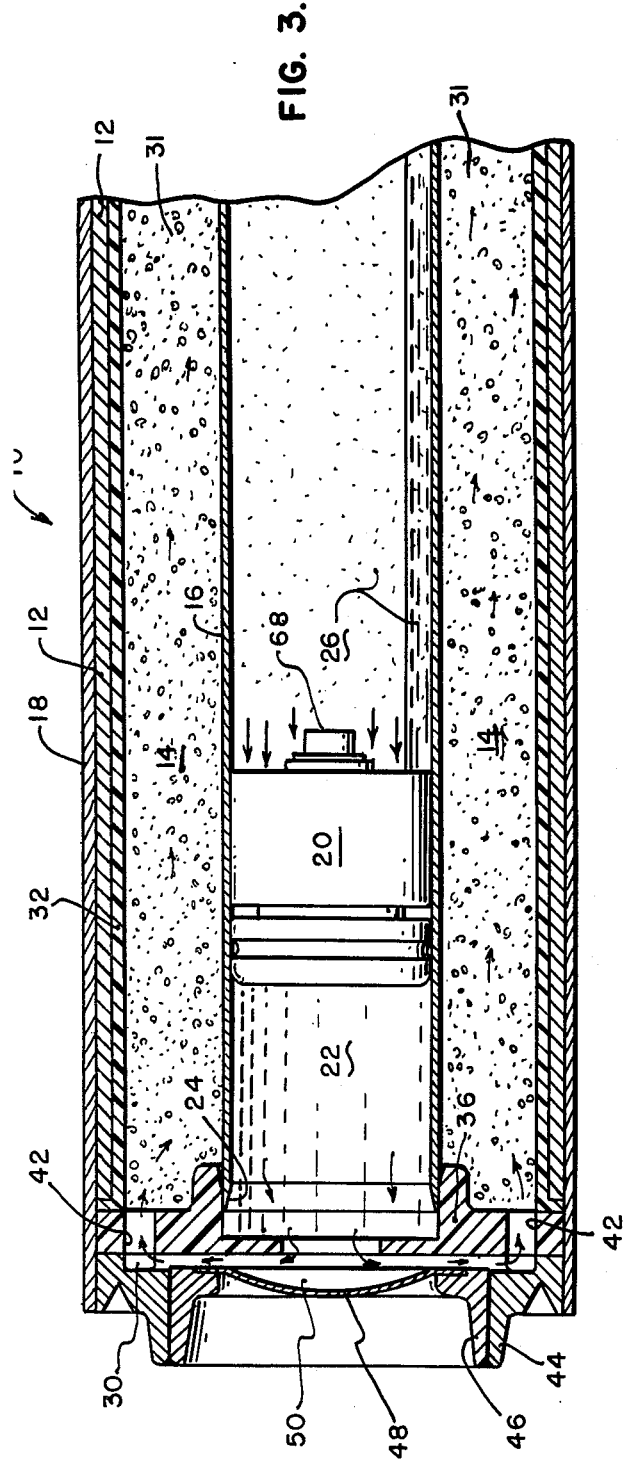
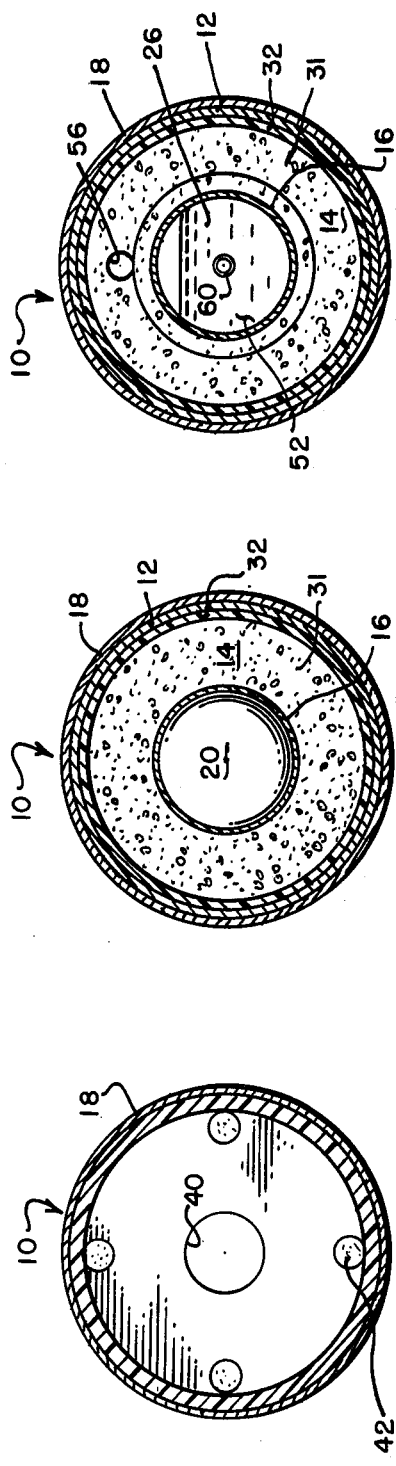

POSITION INSENSITIVE BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a safe high energy density battery which is position insensitive.

One of the most powerful batteries is the lithium thionyl chloride battery. The conventional lithium thionyl chloride battery is constructed in one of two forms. One form is the bobbin construction which has lithium on the walls of a can, and a carbon cylindrical cathode which is separated from the anode by a separator. A metal strip is inserted down the center of the carbon cylinder as a current collector. Another form of the lithium thionyl chloride battery is the jelly roll construction. This type of battery usually has a sheet of lithium metal of considerable length separated from a thin carbon cathode which is impressed on a screen of nickel as a current collector. The lithium metal-separator-carbon cathode pile is then rolled into a roll. The lithium metal is welded to the can and the cathode is welded to the metal strip which acts as a conductor.

The main disadvantage of either of these configurations is that the volume of the reaction products is less than the volume of the thionyl chloride which is consumed. The result is that some of the lithium anode is not reacted, thus resulting in a loss of energy density of the battery. Whether the battery is in a horizontal or a vertical position a portion of the lithium anode is left unexposed to the remaining thionyl chloride.

SUMMARY OF THE INVENTION

The prior art problem of unreacted lithium anode material in prior art lithium thionyl chloride batteries has been overcome by the present invention. The invention is an improvement on the teachings of U.S. Pat. No. 3,669,753 which shows a battery of the type having an anode and a cathode, a pair of spaced apart concentric tubes, a piston mounted in the inner tube, and an electrolyte disposed in the inner tube between one side of the piston and one end of the inner tube, and a device disposed in the inner tube between the other side of the piston and the other end of the inner tube for biasing the piston toward the one end of the inner tube. The improvement of the present invention includes the cathode being porous and being mounted in the annular space, and an electrolyte which substantially completely fills the pores of the cathode. The volume of the electrolyte within the porous cathode is substantially only sufficient for stoichiometry. A passageway is provided which communicates the electrolyte side of the inner tube with the annular space. The volume of the electrolyte within the inner tube is substantially only sufficient for filling the voids left within the annular space as the products react. In the lithium thionyl chloride type battery the anode would be lithium, the cathode would be porous carbon, and the electrolyte carrier would be thionyl chloride. With this arrangement the lithium anode is substantially completely reacted regardless of the position of the battery. The invention has also made another improvement to increase the energy density of the battery by constructing the inner tube of steel so that the inner tube not only serves as a container for the electrolyte but also serves as a current collector. The invention has also provided a very safe battery by utilizing freon as the biasing device on the piston in conjunction with a rupture disc in a battery container which will rupture when the freon expands in response to any thermal excursion. All of these improvements result in a very safe high energy density battery which is position insensitive.

OBJECTS OF THE INVENTION

An object of the present invention is to overcome the aforementioned problems associated with prior art lithium thionyl chloride batteries.

Another object is to provide a lithium thionyl chloride battery in which the lithium anode will be substantially completely reacted regardless of the position of the battery.

A further object is to provide a high energy density battery which is position insensitive.

Still another object is to provide a high energy density battery which is position insensitive and which is safe even if there are thermal excursions.

Yet another object is to provide a safe position insensitive battery.

These and other objects of the invention will become more readily apparent from the ensuing specification when taken together with the drawings.

DESCRIPTION OF THE DRAWINGS

FIG. 3 is a view of the present invention which is similar to the view in FIG. 2 except the battery has been substantially fully discharged.

FIG. 4 is a view taken along plane IV—IV of FIG. 2.

FIG. 5 is a view taken along plane V—V of FIG. 2.

FIG. 6 is a view taken along plane VI—VI of FIG. 2.

DESCRIPTION OF THE PREFERRED EMBODIMENT

Figure 1:
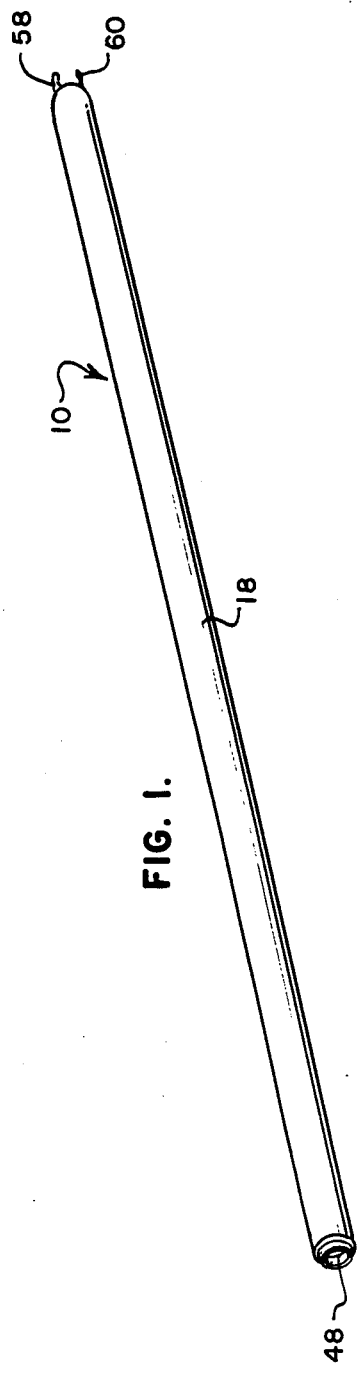
FIG. 1 is a side view of an exemplary embodiment of the present invention.
Figure 2:
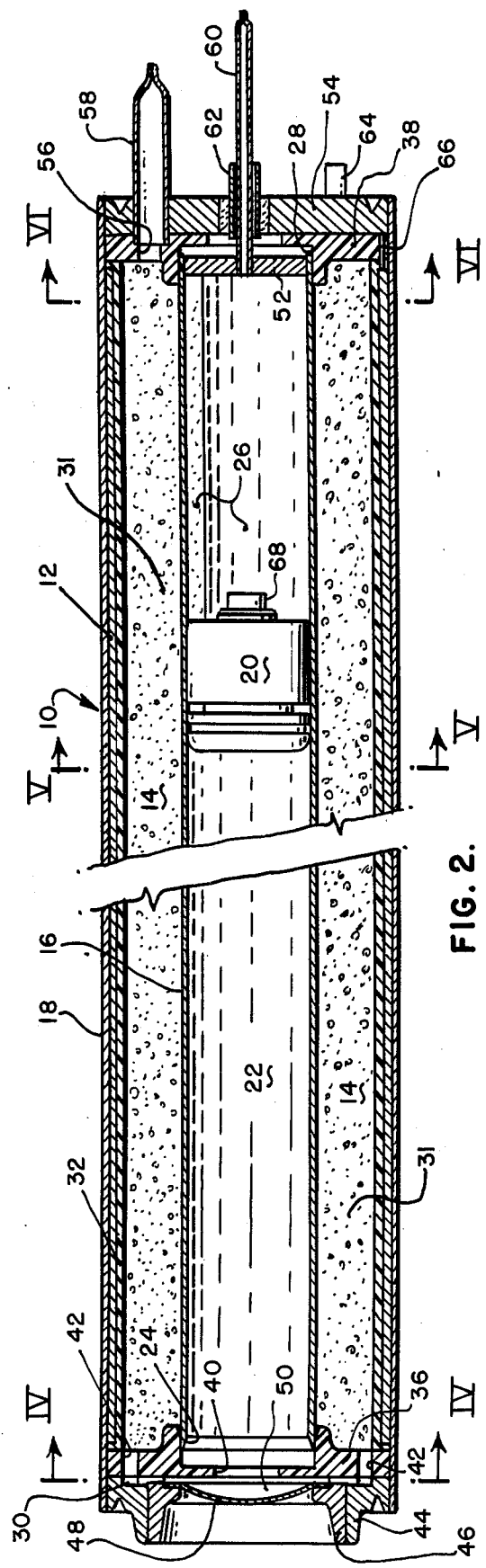
FIG. 2 is an enlarged longitudinal cross-sectional view of the present invention in a fully charged condition with a center portion omitted because of the length thereof.

Referring now to the drawings wherein like reference numerals designate like or similar parts throughout the several views there is illustrated in FIG. 1 an exemplary lithium-thionyl chloride battery 10 which is optimized for energy density, safety, and which is position insensitive. FIG. 2 illustrates the battery 10 in a fully charged condition, and FIG. 3 illustrates the battery in a substantially fully discharged condition. In the fully discharged condition the anode of the battery has been substantially completely reacted regardless of the positioning of the battery. As illustrated in FIG. 2 the battery 10 includes an anode 12 and a cathode 14. The anode and cathode are supported by a pair of spaced apart concentric tubes 16 and 18 with a piston 20 mounted within the inner tube 16. An electrolyte 22 is disposed in the inner tube 16 between one side of the piston and one end 24 of the inner tube. Means 26, which will be described in detail hereinafter, is disposed in the inner tube 16 between the other side of the piston 20 and the other end 28 of the inner tube for biasing the piston 20 toward the end 24 of the inner tube.

The invention is an improvement which includes the cathode 14 being porous and being mounted in the annular space between the inner and outer tubes 16 and 18, and an electrolyte which substantially completely fills the pores of the porous cathode 14. Thus, the invention is intended to be an active battery in contrast to a battery which has a reserve electrolyte which is released at a subsequent time for activating the battery. The volume of the electrolyte within the porous cathode 14 is substantially only sufficient for stoichiometry. Passageway means 30, which will be defined in more detail hereinafter, communicates the electrolyte 22 with the annular space 31. The volume of the electrolyte within the space 22 of the inner tube is substantially only sufficient for filling the voids left within the annular space 31 as the products react therein. The anode 12 is preferably a tube of lithium which is mounted on or adjacent to the interior surface of the outer concentric tube 18. The outer concentric tube 18 may be made of a dielectric material, and the lithium anode 12 may be separated from the porous cathode 14 by a separator 32. The porous cathode 14 may be porous carbon, and the electrolyte in the porous carbon and within the inner tube portion 22 may be in a carrier of thionyl chloride. The entire composition of the electrolyte may include lithium chloride, aluminum tetrachloride and sulfur monochloride in the thionyl chloride carrier. The inner tube 16 is preferably constructed of metal, such as steel, so that it will not only act as a container for the electrolyte at 22 but also as a current collector. This increases the energy density of the battery by the elimination of components.

As illustrated in FIG. 2 Teflon end supports 36 and 38 may be provided for supporting the ends of the inner tube 16 within the outer tube 18. The end support 36 may be provided with a central aperture 40 and radially spaced apertures 42 for providing the passageway means 30 for the make-up electrolyte 22 transitioning into the porous cathode 14. The seal at this passageway end of the battery may be accomplished by an annular end cap 44 which is mounted concentrically within an extension of the outer tube 18, an annular ring 46 which is concentrically mounted within the end cap 44 and a rupture disc 48 which is centrally mounted within the ring 46. The electrolyte 22 may now pass through the aperture 40 into a cavity 50 adjacent the rupture disc 48, hence through the apertures 42 into the porous carbon cathode 14.

At the opposite end of the battery 10 the inner tube 16 may be sealed by an end plate 52, and an outer extension of the outer tube 18 may be sealed by an end cap 54. The end support may be provided with an aperture 56 adjacent the porous carbon cathode 14 and a fill tube 58 may extend through the end cap 54 into the aperture 56 for filling the porous carbon cathode and space 22 with the electrolyte. A metallic fill tube 60 may extend through the end cap 54 and the end cap 52 with a ceramic seal 62 insulating this tube from the end cap 54. The fill tube 60 may then serve a double function, namely: (1) filling the space 26 within the inner tube 16 with freon, and (2) making electrical connection with the inner tube 16 via the metallic end cap 52 so that the fill tube 60 can serve as a negative terminal for the battery. A positive terminal for the battery may be provided at 64 which is electrically connected to the lithium anode 12 via the end cap 54 and a conductor 66. After the fill tubes have been utilized they are crimped solidly to a closed position.

The safety feature of the battery 10 is accomplished by utilizing freon as the biasing means on the piston 20 within the space 26 of the inner tube 16. Further, it is necessary that the disc 48 be constructed so that it will rupture before any other component of the battery. With this arrangement, a thermal excursion or simply the battery 10 being surrounded by excessive heat, such as a fire, will cause the freon 26 to rapidly expand which in turn will cause the piston 20 to provide sufficient force on the disc 48 via the electrolyte 22 to rupture this disc and allow the thionyl chloride to drain therefrom. This will prevent an explosion of the lithium 20 with any elemental sulphur in the cell.

The battery configuration described hereinabove offers an opportunity to measure the amount of charge in the cell at any time. This opportunity has not been afforded by any prior art existing battery. This is accomplished by mounting a magnet 68 on one end of the piston 20. With such an arrangement the location of the magnet 68 within the inner tube 16 can be ascertained by the needle of a compass. When the piston is in the position as illustrated in FIG. 2 the battery can be considered to be substantially fully charged, whereas if the position is at the left end of the inner tube 16, as illustrated in FIG. 3, the battery can be considered to be substantially discharged.

An analysis of the chemical requirements of a 1000 AH cell is set forth in the following paragraphs.

EXAMPLE

Using the relationship that one mole of lithium reacts with one half mole of thionyl chloride to produce one mole of lithium chloride, one quarter mole of sulfur and one quarter mole of sulfur dioxide, the amount of lithium needed for 1000 ampere-hours can be computed. With 10% excess, the amount needed would be 284.9 grams, and since the density of lithium is 0.534 grams this represents a volume of 533.4 cm$^3$. This volume of lithium metal 12 is bonded to the inner surface of the dielectric tube 18. Let $r_o$ represent the inner radius of the dielectric tube 18. The thickness of the lithium tube 12 can be determined from a mathematical relationship. Let $r_o$ represent the inner radius of the dielectric tube 18 and $r_i$ represent the inner radius after the application of the lithium metal. If T represents the thickness of the metal it is clear that:

$$T = r_o - r_i$$

where L = length of tube $$V_{Li} = \pi r_o^2 L - \pi r_i^2 L$$

$$V_{Li} = \pi r_o^2 L - \pi L(r_o - T)^2$$

$$V_{Li} = \pi r_o^2 L - \pi L(r_o^2 - 2r_oT + T^2)$$

$$V_{Li} = \pi r_o^2 L - r_o^2 L\pi + 2r_oTL\pi - \pi LT^2$$

$$V_{Li} = 2r_oTL\pi - \pi LT^2$$

$$\pi LT^2 - 2r_oTL\pi + V_{Li} = 0$$

The final simplified equation is in the form of a quadrate and can be solved by the quadrate equation:

$$x = \frac{-b \pm \sqrt{b^2 - 4ac}}{2a}$$

Accordingly,
  $b = -2r_o L \pi$
  $a = \pi L$
  $C = V_{Li}$
In this example
  $r_o = 2.7686$ cm
  $L = 151.4$ cm
  $V_{Li} = 533.3$ cm$^3$ Accordingly, $T = 0.21$ cm. During discharge the surface area of the anode will increase and will range from 2434 cm$^2$ up to a limit of 2634 cm$^2$.

For stoichiometry the battery will consume 1473 cm$^3$ of SOCl$_2$ and will need 392 cm$^3$ of S$_2$Cl$_2$ to solubilize the product sulfur. During discharge there will be produced 179 cm$^3$ of sulfur, 842.1 cm$^3$ lithium chloride and, if totally liquified, 458.4 cm$^3$ of sulfur dioxide. The total volume of reactants is 2008.3 cm$^3$. The total volume of products is 1479.1 cm$^3$. The result is a volume reduction of 529.2 cm$^3$. The cathode 14 will be bonded to a 2.858 cm (1.125 in.) diameter, 0.124 cm (49 mil), 316L stainless steel pipe 16. Therefore, the volume of the cathode is calculated as follows:

$$V = \pi L (r_o^2 - r_i^2)$$

$$V = 2077 \text{ cm}^3$$

when $r_o = 2.5375$ cm
  $r_i = 1.429$ cm where $R_o$ is the outer radius defined by the lithium and separator surface and $r_i$ the inner radius. The inner radius is the outer surface of the 1.125 inch-diameter tube pipe 16 which acts as a cathode current collector and a reservoir for the electrolyte 22. Using a cathode efficiency of 1.84 AH/g of carbon, 542.8 grams or 266 cm$^3$ of carbon is needed and, if 10% Teflon is used as a binder, 27 cm$^3$ of Teflon will be needed. The cathode volumes are as follows:

| | | |
|---|---|---|
| Void Vol of cathode | = | 2091.6 cm$^3$ |
| carbon vol | = | 266.2 cm$^3$ |
| teflon | = | 26.6 cm$^3$ |
| Cathode Volume | | 2384.4 cm$^3$ |

From the above it can be seen that the 1867 cm$^3$ of SOCl$_2$ and S$_2$Cl$_2$ required for stoichiometry can be contained in the cathode void volume.

The reservoir, as stated before, is constructed from a 1.125 in. diameter 49 mil, 316L stainless steel pipe 16. The inner radius would be 1.3043 cm (0.514 in.).

$$V = \pi r^2 L$$

$$V = 803.4 \text{ cm}^3$$

where $r = 1.3043$ cm
  $L = 150.3$ cm

If a volume of 529 cm$^3$ is needed for make-up electrolyte and the volume of the cathode current collector-reservoir is 803.4 cm$^3$, then 274 cm$^3$ can be used for the freon propellent 26 for the expansion of the electrolyte due to temperature variation, and for the piston 20. The length of the pipe available for this is:

$$L = V/r^2$$

$L = 161$ cm where $r = 1.3043$ cm
  $V = 274$ cm$^3$

The assumed volume of 529 cm$^3$ for the reservoir is based on the previously computed shrinkage.

The volume of electrolyte needed for the battery is approximately 2328 cm$^3$ and should have the following composition if a 1.0 M concentration is used:

| | |
|---|---|
| Li Cl | 103.6 grams |
| Al Cl$_3$ | 310.4 grams |
| S$_2$ Cl$_2$ | 671.2 grams |
| SO Cl$_2$ | 2896.7 grams |

With this arrangement there is an 18.8% excess of SOCL$_2$ over stoichiometric demand. A fusion process should be used to prepare LiAlCl$_4$ from the LiCl and AlCl$_3$ according to the following formulation.

$$1.05 \text{ mole LiCl} + 1.0 \text{ mole AlCl}_3 \xrightarrow{300F} \text{LiAlCl}_4$$

The LiCl should be of reagent AR grade and the AlCl$_3$ should be reagent AR grade that has been resublimed. The S$_2$Cl$_2$ should be redistilled off of Li under dry argon in vacuum. The SOCl$_2$ should be treated in a similar way. The separator 32 should be constructed of 8 mil nonwoven glass with a porosity greater than 60 percent.

The tube 16 performs several functions. It provides structural support and a current collector for the cathode 14, it provides volume for make-up electrolyte storage 22, and volumetric expansion of the electrolyte due to temperature variations, and it permits battery operation independent of attitude by means of its positive expulsion system.

OPERATION OF THE INVENTION

In the operation of the battery 10 the porous carbon 14 and the reservoir 22 are filled with electrolyte via the tube 58. The compartment 26 on the other side of the piston 20 is then filled with freon via the tube 60. The tubes 58 and 60 are crimped to a closed condition as illustrated in FIG. 2. The battery is now enabled and can be stored for long periods of time prior to use. When the battery is utilized the lithium 32 is progressively reacted causing the piston 20 to move towards the left by the action of the expanding freon 26. The electrolyte 22 is forced into the porous cathode 14 as a make-up for the electrolyte reacted with the lithium 32 in the porous carbon 14. When the battery has been fully depleted the piston 20 will be located all the way to the left in the drawings.

Obviously, many modifications and variations of the present invention are possible in the light of the above teachings, and, it is therefore understood that within the scope of the disclosed inventive concept, the invention may be practiced otherwise than specifically described.

What is claimed is:

1. In a battery having an anode and a cathode, a pair of spaced apart concentric tubes which provide an annular space therebetween, a piston mounted in the inner tube, an electrolyte disposed in the inner tube between one side of the piston and one end of the inner tube, and means disposed in the inner tube between the other side of the piston and the other end of the inner tube for biasing the piston toward said one end of the inner tube, the improvement comprising:

said cathode being porous and being mounted in said annular space;

an electrolyte substantially completely filling the pores of said cathode;

the volume of the electrolyte within the porous cathode being substantially only sufficient for stoichiometry;

passageway means communicating the electrolyte side of the inner tube with said annular space; and the volume of the electrolyte within the inner tube being substantially only sufficient for filling the voids left within the annular space as the products react, whereby, regardless of the position of the battery, the anode will be substantially completely reacted.

2. In a battery as claimed in claim 1, the improvement further including:

the inner tube being steel.

3. In a battery as claimed in claim 1, the improvement further including:

a pair of caps sealing the ends of the outer tube;

the cap adjacent said one end of the inner tube having a disc which will rupture before any other component of the battery; and the biasing means being freon.

4. In a battery as claimed in claim 1, the improvement further comprising:

a magnet mounted on the piston whereby location of the piston within the inner tube can be ascertained to indicate remaining life of the battery.

5. In a battery as claimed in claim 1, the improvement further including:

the anode being a tube of lithium which is mounted on the interior surface of the outer concentric tube; and the electrolyte being in a carrier of thionyl chloride.

6. In a battery as claimed in claim 5 the improvement further including:

the inner tube being steel.

7. In a battery as claimed in claim 6, the improvement further including:

a pair of caps sealing the ends of the outer tube;

the cap adjacent said one end of the inner tube having a disc which will rupture before any other component of the battery; and the biasing means being freon.

8. In a battery as claimed in claim 7 the improvement further including:

a magnet mounted on the piston whereby location of the piston within the inner tube can be ascertained to indicate remaining life of the battery.

9. In a battery having an anode and a cathode, a pair of spaced apart concentric tubes which provide an annular space therebetween, a piston mounted in the inner tube, an electrolyte disposed in the inner tube between one side of the piston and one end of the inner tube, and means disposed in the inner tube between the other side of the piston and the other end of the inner tube for biasing the piston toward said one end of the inner tube, the improvement comprising:

said cathode being porous and being mounted in said annular space;

an electrolyte substantially completely filling the pores of said cathode;

a pair of caps sealing the ends of the outer tube;

the cap adjacent said one end of the inner tube having a disc which will rupture before any other component of the battery; and the biasing means being freon.

10. In a battery as claimed in claim 9, the improvement further including:

a magnet mounted on the piston whereby location of the piston within the inner tube can be ascertained to indicate remaining life of the battery.

* * * * *